(12) United States Patent
Takakuwa et al.

(10) Patent No.: US 10,138,914 B2
(45) Date of Patent: Nov. 27, 2018

(54) SENSOR ATTACHMENT TOOL

(71) Applicant: SMC CORPORATION, Chiyoda-ku (JP)

(72) Inventors: Youji Takakuwa, Kitakatsushika-gun (JP); Mitsuru Machijima, Matsudo (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/565,909

(22) PCT Filed: Feb. 29, 2016

(86) PCT No.: PCT/JP2016/055993
§ 371 (c)(1),
(2) Date: Oct. 12, 2017

(87) PCT Pub. No.: WO2016/167035
PCT Pub. Date: Oct. 20, 2016

(65) Prior Publication Data
US 2018/0112689 A1    Apr. 26, 2018

(30) Foreign Application Priority Data

Apr. 16, 2015  (JP) .................................. 2015-083875
Sep. 28, 2015  (JP) .................................. 2015-189428

(51) Int. Cl.
*E21B 17/00*     (2006.01)
*E21B 47/01*     (2012.01)
(Continued)

(52) U.S. Cl.
CPC .......... *F15B 15/2892* (2013.01); *F15B 15/28* (2013.01); *F16B 2/08* (2013.01)

(58) Field of Classification Search
CPC .......... E21B 17/00; E21B 17/01; E21B 47/01; F15B 15/2892; F16B 2/08
See application file for complete search history.

(56) References Cited

U.S. PATENT DOCUMENTS 6,007,034 A * 12/1999 Stoll .................... F15B 15/2892
                                                 248/229.1
7,398,697 B2 * 7/2008 Allen ...................... E21B 17/01
                                                      73/800

(Continued)

FOREIGN PATENT DOCUMENTS

CN    103299091 A    9/2013
JP    56-35992 U     4/1981
(Continued)

OTHER PUBLICATIONS

Office Action dated May 25, 2017 in Taiwanese Patent Application No. 105106869 (with partial English translation).
(Continued)

*Primary Examiner* — Matthew R Buck
(74) *Attorney, Agent, or Firm* — Oblon, McClelland, Maier & Neustadt, L.L.P.

(57) ABSTRACT

A sensor attachment tool is provided with a rail-shaped sensor holder having a sensor insertion groove for accommodatably holding a position sensor so that the position of the position sensor can be adjusted, a band part linkable at both ends to the sensor holder and configured so as to be fitted over the outer peripheral surface of a cylinder tube along the peripheral direction, and a tightening mechanism for tightening the band part, the tightening mechanism being arranged on the outer peripheral surface of the cylinder tube in a different peripheral position than the sensor holder.

9 Claims, 14 Drawing Sheets

(51) Int. Cl.
*F15B 15/28* (2006.01)
*F16B 2/08* (2006.01)

(56) References Cited

U.S. PATENT DOCUMENTS

| | | | | |
|---|---|---|---|---|
| 8,240,624 | B2 * | 8/2012 | Terasaki | G01D 11/245 |
| | | | | 248/230.8 |
| 9,512,714 | B2 * | 12/2016 | Sobolewski | E21B 47/01 |
| 9,528,816 | B2 * | 12/2016 | Machijima | G01B 7/14 |
| 9,851,260 | B2 * | 12/2017 | Yumoto | F16B 2/10 |
| 2003/0010126 | A1 * | 1/2003 | Romanet | G01N 9/36 |
| | | | | 73/649 |
| 2013/0263733 | A1 | 10/2013 | Machijima et al. | |
| 2014/0354974 | A1 * | 12/2014 | Brower | G01L 1/242 |
| | | | | 356/32 |

FOREIGN PATENT DOCUMENTS

| | | | | | |
|---|---|---|---|---|---|
| JP | 08110202 | A | * | 4/1996 | .......... F15B 15/2892 |
| JP | 2004125150 | A | * | 4/2004 | .......... F15B 15/2892 |
| JP | 2012-122591 | A | | 6/2012 | |
| JP | 2012-132500 | | | 7/2012 | |
| JP | 2013060980 | A | * | 4/2013 | .......... F15B 15/2892 |

OTHER PUBLICATIONS

International Search Report dated May 31, 2016 in PCT/JP2016/05593, filed on Feb. 29, 2016 (with English translation).
Japanese Office Action dated Apr. 10, 2018 in Japanese Patent Application No. 2016-036887 (with English translation), citing document AO therein, 7 pages.

* cited by examiner

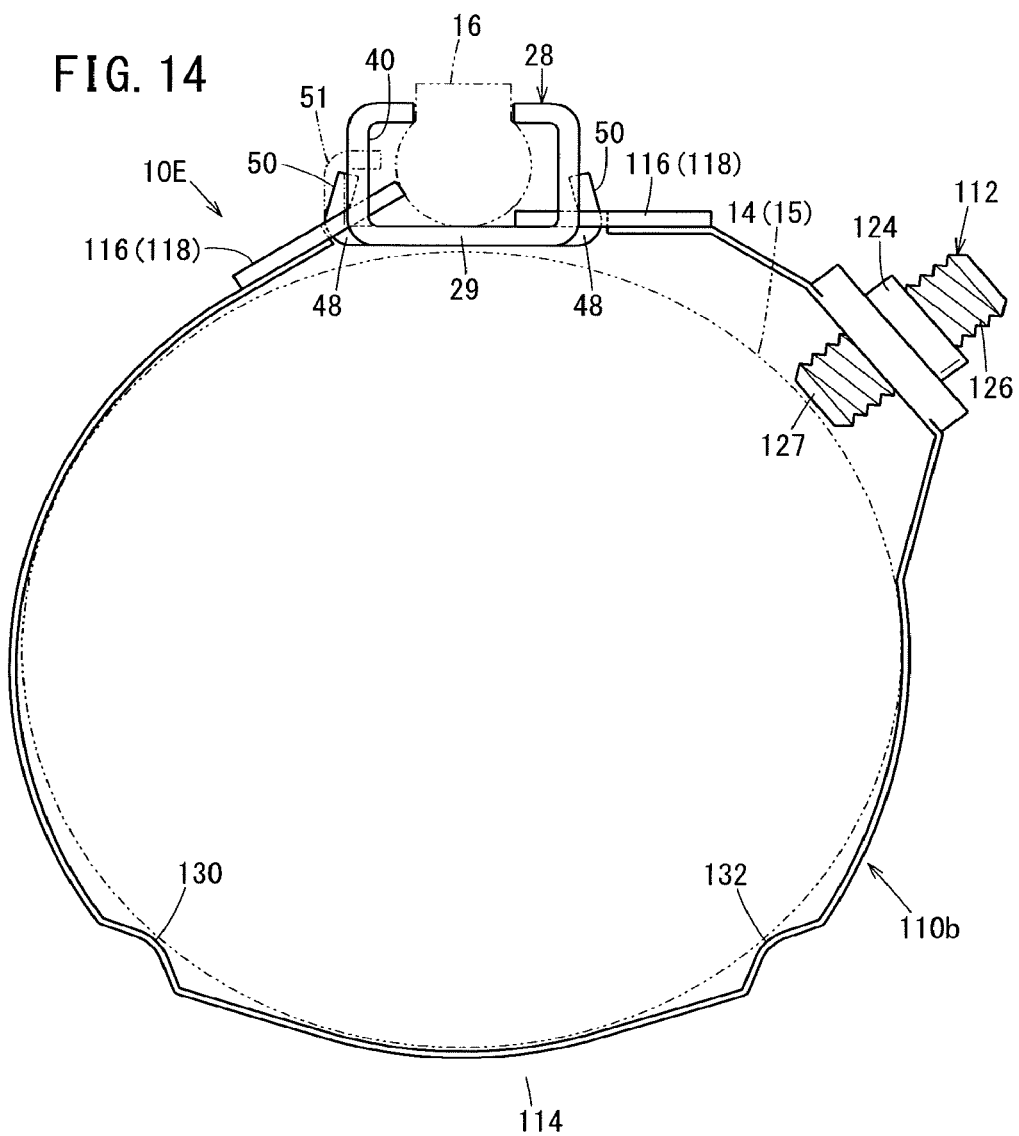

SENSOR ATTACHMENT TOOL

TECHNICAL FIELD

The present invention relates to a sensor fixture (sensor attachment tool) for attaching a sensor to an outer circumferential surface of a cylinder tube.

BACKGROUND ART

Conventionally, a position sensor is attached to an outer circumferential surface of a fluid pressure cylinder such as an air cylinder, and detects a position of a piston disposed in a cylinder tube. A sensor fixture for attaching such a position sensor to the outer circumferential surface of the cylinder tube is disclosed by, for example, Japanese Laid-Open Patent Publication No. 2012-122591.

The sensor fixture (device fixture) disclosed in Japanese Laid-Open Patent Publication No. 2012-122591 includes an attachment band disposed along an outer circumferential surface of a cylinder tube, and a fixed metal fitting that is integrally formed with a position sensor and on which both end portions of the attachment band are hooked. The attachment band includes a fastening portion formed by folding a part of the attachment band, a fastening screw is inserted in an insertion hole formed in each folded piece of the fastening portion, and a nut is screwed onto the fastening screw that penetrates the insertion hole.

SUMMARY OF INVENTION

According to the above conventional sensor fixture, the both end portions of the attachment band are hooked on the fixed metal fitting integrally formed with the sensor.

Therefore, for adjusting an attachment position of the position sensor with respect to the cylinder tube, it is necessary to displace the attachment band with respect to the cylinder tube. Therefore, operation of adjusting the attachment position of the sensor with respect to the cylinder tube is cumbersome, and is desired to be improved. The sensor fixture desirably has a small protrusion from the outer circumferential surface of the cylinder tube, and has a compact structure.

The present invention has been made by taking such a problem into account. An object of the present invention is to provide a sensor fixture which makes it possible to easily adjust an attachment position of a sensor with respect to a cylinder tube, and has a compact structure.

To achieve the above object, according to the present invention, there is provided a sensor fixture configured to attach a sensor to an outer circumferential surface of a cylinder tube, the sensor fixture including: a rail-shaped sensor holder including a sensor insertion groove configured to house and hold the sensor so as to enable position adjustment of the sensor; a band portion including both end portions couplable to the sensor holder, the band portion being configured to be attached to the outer circumferential surface of the cylinder tube along a circumferential direction thereof; and a fastening mechanism disposed at a circumferential position different from the sensor holder on the outer circumferential surface of the cylinder tube, the fastening mechanism being configured to fasten the band portion.

According to the sensor fixture of the present invention configured as described above, the sensor holder is formed in the rail shape, and the fastening mechanism is provided at a position shifted from the sensor holder. Consequently, it is possible to easily adjust an attachment position of the sensor with respect to the cylinder tube, and reduce the size of the sensor fixture.

In the above sensor fixture, the fastening mechanism may include: a female screw portion provided on the band portion; a fastening screw configured to be screwed into the female screw portion; and an abutment plate provided inside the band portion at a position corresponding to the female screw portion and configured to be placed in abutment with the outer circumferential surface of the cylinder tube, and pressed by the fastening screw.

According to the above configuration, by fastening the fastening screw, it is possible to easily tighten the band portion. The fastening screw does not directly contact the outer circumferential surface of the cylinder tube. Consequently, it is possible to effectively prevent deformation of the outer circumferential surface of the cylinder tube during fastening of the fastening screw.

In the sensor fixture, a nut in which the female screw portion is formed may be fixated to the band portion.

With this configuration, it is possible to easily arrange the female screw portion with which the fastening screw is appropriately screw-engaged.

In the sensor fixture, the sensor holder may include: a holder main body; and coupling arm portions protruding from both sides of the holder main body and provided with hooks; the band portion includes, at both end portions thereof, engagement holes with which the hooks can engage; and the fastening mechanism is provided at a substantially center position of the band portion in an extension direction thereof.

According to this configuration, it is possible to easily couple the sensor holder and the band portion. The fastening mechanism is placed at a portion distant from an engagement portion of the sensor holder and the band portion. Consequently, it is possible to suitably prevent the hooks of the coupling arm portions from slipping from the engagement holes during fastening of the fastening screw.

In the sensor fixture, the sensor holder may include: a holder main body; and an arm portion protruding sideward from the holder main body and bent; and the fastening mechanism includes: a female screw portion provided on the arm portion; a fastening screw configured to be screwed into the female screw portion; and a stopper provided at one end portion of the band portion and pressed by the fastening screw.

With the above configuration, it is possible to easily apply a tension to the band portion by fastening the fastening screw. The fastening screw does not directly contact the outer circumferential surface of the cylinder tube. Consequently, it is possible to effectively prevent deformation of the outer circumferential surface of the cylinder tube during fastening of the fastening screw.

In the sensor fixture, an opening portion may be formed at the one end portion of the band portion and penetrate through the band portion in a thickness direction thereof; and the arm portion may be inserted in the opening portion, and face toward the stopper at an outside of the band portion.

According to this configuration, it is possible to suitably apply a tension to the band portion.

In the sensor fixture, a nut in which the female screw portion is formed may be fixated to the arm portion.

According to this configuration, it is possible to easily arrange the female screw portion with which the fastening screw is appropriately screw-engaged.

In the sensor fixture, the sensor holder includes: a holder main body; and coupling arm portions protruding from both sides of the holder main body, and provided with hooks; band end portions are provided at both end portions of the band portion, and include engagement holes with which the hooks can engage; and in a state where the sensor is attached to the holder main body, the band end portions are prevented from being disengaged from the hooks due to interference with the sensor.

According to the configuration, as long as the sensor is not detached from the sensor holder, the band end portions are not detached from the hooks of the sensor holder. Consequently, even when the fastening mechanism loosens, it is possible to prevent the band portion from being detached and the sensor from falling off.

In the sensor fixture, the fastening mechanism may include: a female screw portion provided to the band portion; and a fastening screw configured to be screwed into the female screw portion, and placed in abutment with the outer circumferential surface of the cylinder tube in a state where the sensor fixture is attached to the cylinder tube, and the band portion may include a projection portion protruding inward at a position on an opposite side of the cylinder tube from the fastening mechanism in the state where the sensor fixture is attached to the cylinder tube.

With this configuration, force that presses the outer circumferential surface of the cylinder tube during fastening of the fastening mechanism is dispersed in the circumferential direction, and it is possible to correct the shape of the cylinder tube, compared to a case where the projection portion is not arranged. Consequently, it is possible to suppress a stick-slip phenomenon (knocking) during a piston operation.

In the sensor fixture, the band portion may include another projection portion protruding inward at a substantially center position between the fastening mechanism and the projection portion.

With this configuration, the force that presses the outer circumferential surface of the cylinder tube is further dispersed in the circumferential direction during fastening of the fastening mechanism. Consequently, it is possible to more effectively suppress the stick-slip phenomenon during the piston operation.

The sensor fixture according to the present invention makes it possible to easily adjust an attachment position of the sensor with respect to the cylinder tube, and reduce the size of the sensor fixture.

BRIEF DESCRIPTION OF DRAWINGS

FIG. 14 is a front view of the sensor fixture shown in FIG. 13.

DESCRIPTION OF EMBODIMENTS

Figure 1:
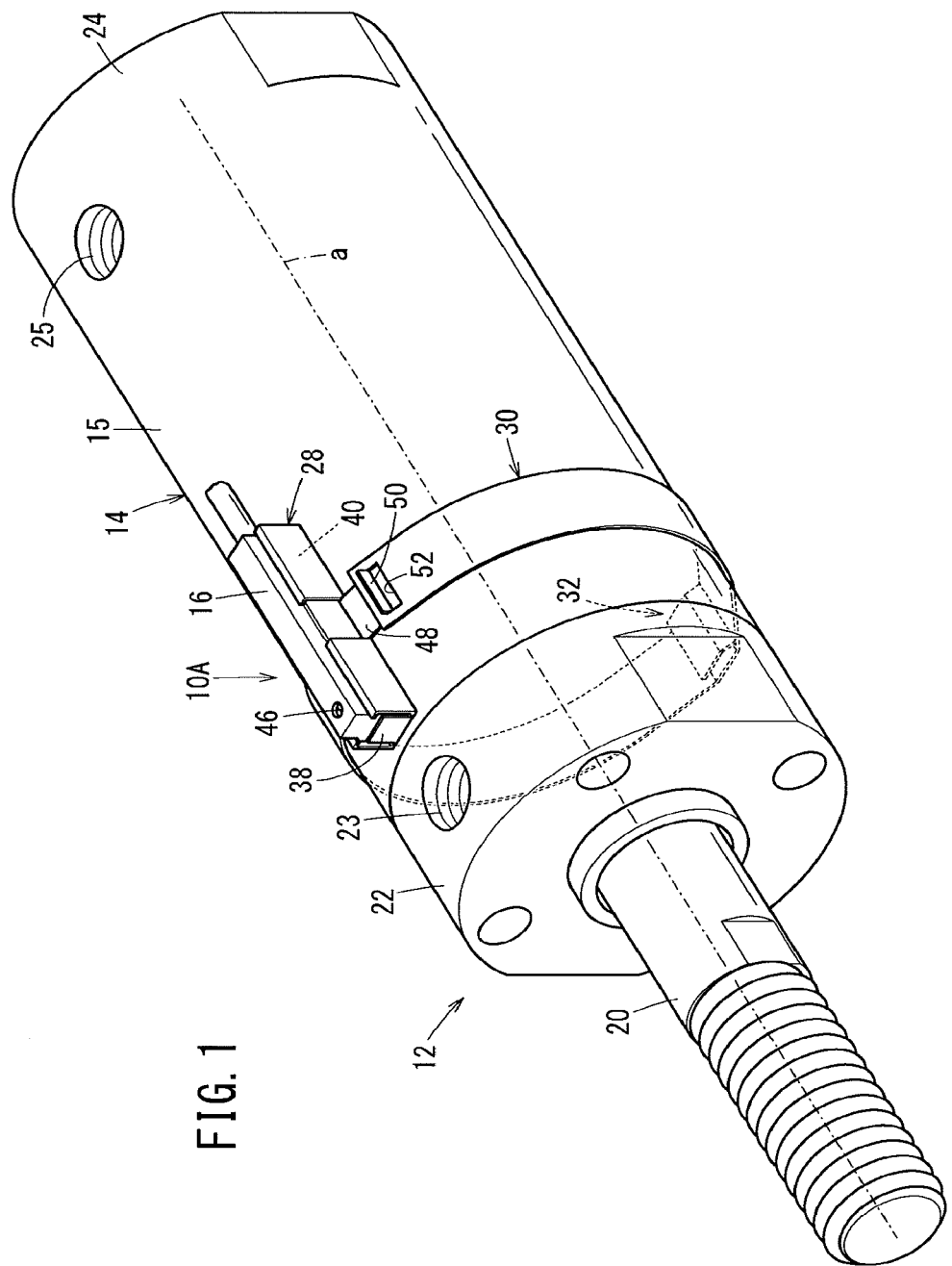
FIG. 1 is a perspective view of a fluid pressure cylinder to which a sensor fixture according to a first embodiment of the present invention is attached.

Preferred first to fifth embodiments of a sensor fixture according to the present invention will be described below with reference to the accompanying drawings. Components of the second to fifth embodiments that provide the same or similar functions and effects as or to those of the first embodiment will be denoted by the same reference numerals, and will not be described in detail.

[First Embodiment]

As shown in FIG. 1, a sensor fixture 10A according to the first embodiment of the present invention is attached to an outer circumferential surface 15 of a cylinder tube 14 of a fluid pressure cylinder 12 (e.g., air cylinder) and is used to attach a position sensor 16 to the outer circumferential surface 15.

The fluid pressure cylinder 12 includes the cylinder tube 14 having a cylindrical shape that includes a cylinder hole therein, a piston that is housed in the cylinder tube 14 so as to be slidable along a center axis a, and a piston rod 20 that is coupled to the piston and protrudes to the outside.

A pressure fluid (e.g., compressed air) is alternately supplied to and discharged from pressure chambers on both sides of the piston through a port 23 of a rod cover 22 formed at one end of the cylinder tube 14 and a port 25 formed in a head portion 24 at the other end, to thereby move the piston forward or backward. A permanent magnet having a ring shape is attached to an outer circumferential surface of the piston, and the position sensor 16 detects magnetism of this permanent magnet and outputs a detection signal of an operating position of the piston.

Figure 2:
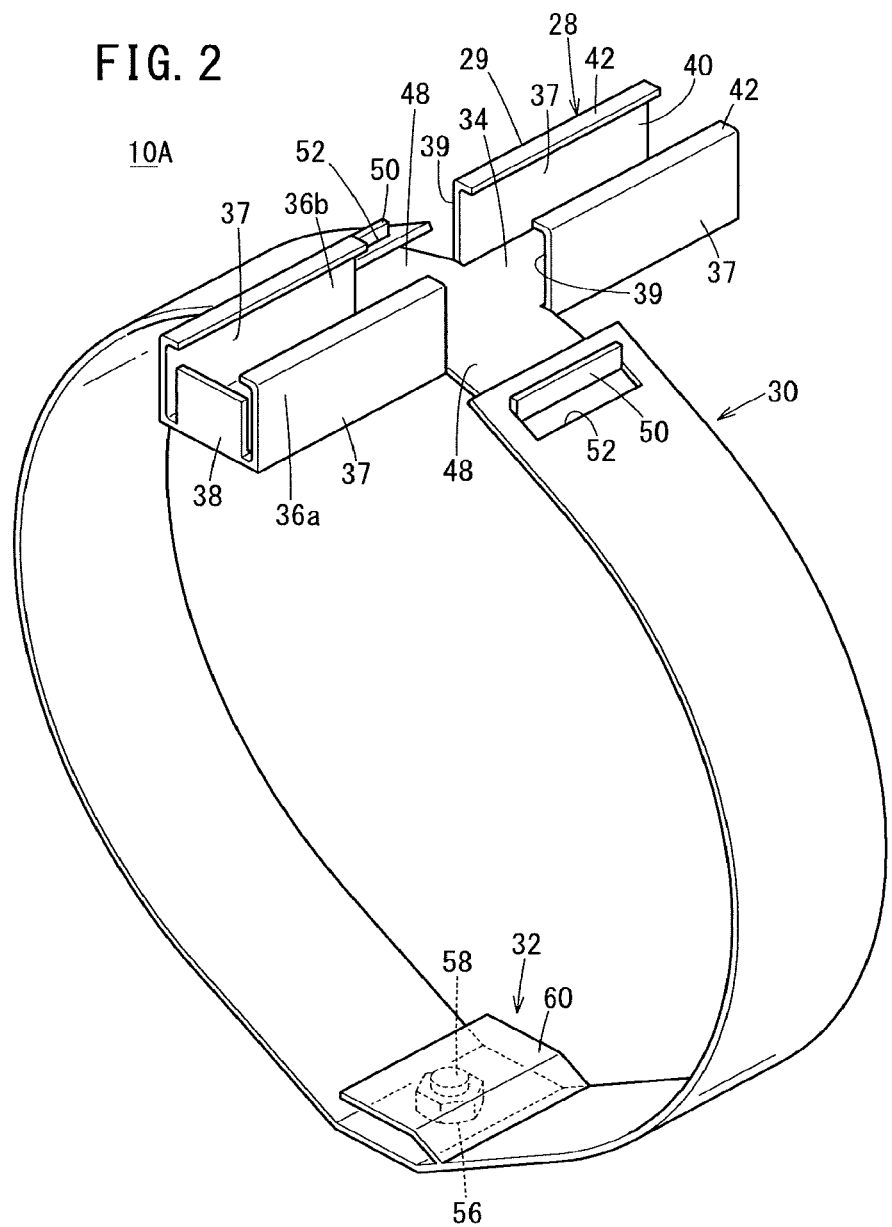
FIG. 2 is a perspective view of the sensor fixture shown in FIG. 1.

As shown in FIGS. 1 and 2, the sensor fixture 10A includes a rail-shaped sensor holder 28 that holds the position sensor 16, a band portion 30 that is coupled to the sensor holder 28 and wound around the outer circumferential surface 15 of the cylinder tube 14, and a fastening mechanism 32 that fastens the band portion 30. The sensor holder 28 is disposed with a longitudinal direction of the sensor holder 28 being oriented in an axial direction of the fluid pressure cylinder 12.

As shown in FIG. 2, the sensor holder 28 includes a bottom wall 34 having a rectangular shape, sidewalls 36a, 36b that are vertically arranged from long sides on both sides of the bottom wall 34 and face toward each other, and an end wall 38 that is vertically arranged from a short side on one end side of the bottom wall 34. The bottom wall 34 and the sidewalls 36a, 36b form a sensor insertion groove 40 that houses and holds the position sensor 16 so as to enable positioning of the position sensor 16.

Each of the sidewalls 36a, 36b is divided into mutually-spaced two wall elements 37 via a cutout portion 39 in the longitudinal direction of the sensor holder 28. Overhang portions 42 are formed at edges of the sidewalls 36a, 36b on a side remote from the bottom wall 34, and protrude toward an inside of the sensor holder 28. The sensor holder 28 is made of, for example, metal such as stainless steel, and can be formed by performing press working and folding on a metal plate.

Figure 3:
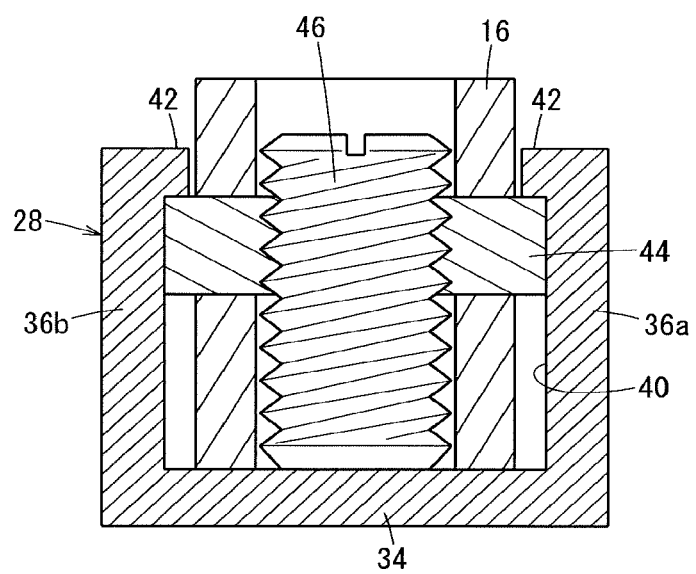
FIG. 3 is an explanatory view of a fixing structure of a position sensor with respect to a sensor holder.

The position sensor 16 is inserted and fixed in the sensor holder 28 configured as described above. As shown in FIG. 3, a nut 44 is inserted in one end portion of the position sensor 16 attached to the sensor holder 28, and a locking screw 46 is screwed into this nut 44. When the locking screw 46 is fastened, the nut 44 is held down by the overhang portions 42 protruding from an opening edge of the sensor holder 28 toward the inside of the sensor holder 28. Consequently, the position sensor 16 is fixed to the sensor holder 28. Conversely, when the locking screw 46 is loosened, the position sensor 16 is allowed to move along the sensor insertion groove 40, whereby the position of the position sensor 16 can be finely adjusted along the axial direction (stroke direction) of the fluid pressure cylinder 12.

Figure 4:
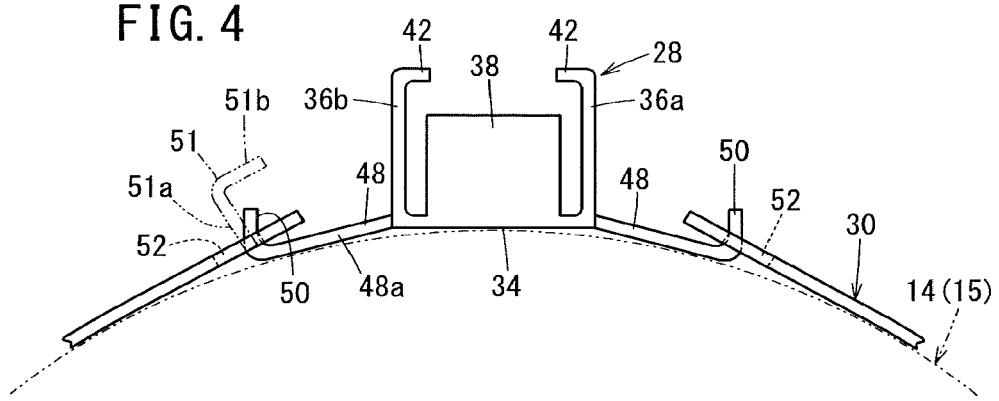
FIG. 4 is an explanatory view of a coupling structure of the sensor holder and a band portion.

As shown in FIGS. 1, 2 and 4, the sensor holder 28 includes two coupling arm portions 48 that protrude toward both sides and are bent. More specifically, in the present embodiment, the two coupling arm portions 48 protrude in opposite directions from the long sides of the bottom wall 34. Each coupling arm portion 48 slightly inclines with respect to the bottom wall 34 of the sensor holder 28 along the outer circumferential surface 15 of the cylinder tube 14. A hook 50 bent upward is formed at an outer end of each coupling arm portion 48 (an end portion in a protrusion direction from the bottom wall 34).

The band portion 30 includes both end portions couplable to the sensor holder 28, and is configured to be attachable to the outer circumferential surface 15 of the cylinder tube 14 along a circumferential direction. The band portion 30 can be formed by curving and deforming, for example, a belt-shaped thin metal sheet in a circular arc shape.

In the present embodiment, engagement holes 52 are formed at both end portions of the band portion 30 so as to penetrate in a thickness direction of the band portion 30, and can engage with the coupling arm portions 48 (more specifically, the hooks 50) of the sensor holder 28. As shown in FIG. 4, by inserting the hooks 50 of the coupling arm portions 48 in the engagement holes 52 and making the hooks 50 protrude from the engagement holes 52 toward an outer circumference side of the band portion 30, the coupling arm portions 48 and the end portions of the band portion 30 are coupled.

As shown in FIG. 1, the fastening mechanism 32 is disposed at a circumferential position different from the sensor holder 28 on the outer circumferential surface 15 of the cylinder tube 14. More specifically, in the present embodiment, the fastening mechanism 32 is disposed at a substantially center position in the extension direction (circumferential direction) of the band portion 30. Hence, in a state where the sensor fixture 10A is attached to the outer circumferential surface 15 of the cylinder tube 14, the fastening mechanism 32 is disposed on an opposite side of the cylinder tube 14 from the sensor holder 28.

Figure 5:
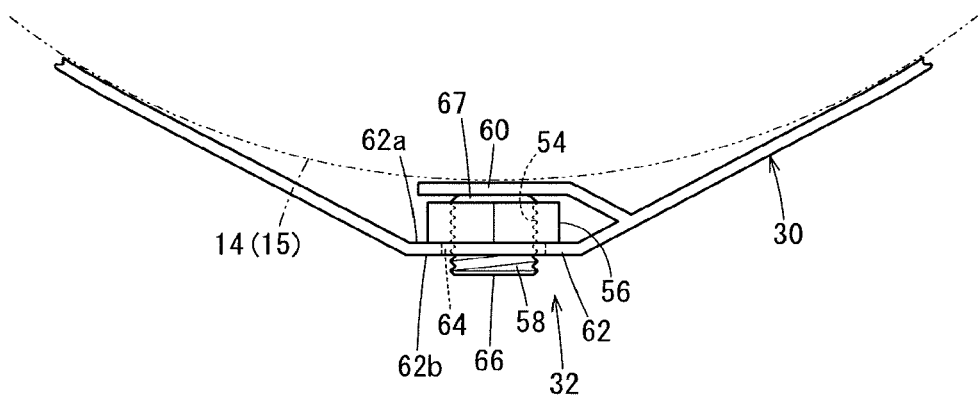
FIG. 5 is an explanatory view of a structure of a fastening mechanism.

As shown in FIG. 5, the fastening mechanism 32 includes a nut 56 that is fixated to the band portion 30 and in which a female screw portion 54 is formed, a fastening screw 58 that is screwed into the female screw portion 54, and an abutment plate 60 that is pressed by the fastening screw 58. The band portion 30 includes a flat plate portion 62 at a portion to which the nut 56 is fixated. The nut 56 is welded and fixated to an inner surface 62a of the flat plate portion 62 (a surface on an inner circumference side of the band portion 30). Alternatively, the nut 56 may be fixated to an outer surface 62b of the flat plate portion 62.

A through hole 64 is formed in the flat plate portion 62. The fastening screw 58 is inserted in the through hole 64 without being screw-engaged therein. For the purpose of turning the fastening screw 58 by a tool such as a screwdriver or a hexagonal wrench, a non-circular (cross shaped, hexagonal, etc.) tool insertion groove is formed at a head portion 66 of the fastening screw 58. A distal end 67 of the fastening screw 58 can protrude from the nut 56 toward the abutment plate 60.

The abutment plate 60 is arranged inside the band portion 30 at a position corresponding to the female screw portion 54 (nut 56), and is in contact with the outer circumferential surface 15 of the cylinder tube 14 in a state where the sensor fixture 10A is attached to the cylinder tube 14. The abutment plate 60 branches from a surface on the inner circumference side of the band portion 30, or is jointed to the surface on the inner circumference side and cantilevered by the band portion 30. This abutment plate 60 can be fixated to the inner circumferential surface of the band portion 30, for example, by welding.

Next, operation and effects of the sensor fixture 10A constructed as described above will be described.

To attach the position sensor 16 to the outer circumferential surface 15 of the cylinder tube 14 by using the sensor fixture 10A, the position sensor 16 is inserted and fixed in the sensor holder 28, and the sensor fixture 10A in this state is arranged along the outer circumferential surface 15 of the cylinder tube 14. In this case, in a state where only one end portion of the band portion 30 is coupled to the sensor holder 28 (the one hook 50 is engaged with the one engagement hole 52), and the fastening screw 58 is loosened, the sensor fixture 10A is arranged along the outer circumferential surface 15 of the cylinder tube 14. In place of the one hook 50, a hook 51 having a shape indicated by an imaginary line in FIG. 4 may be provided. The hook 51 includes a rising portion 51a that rises at a right angle from an outer end of a base portion 48a of the coupling arm portion 48, and a fold-back portion 51b that is bent at a right angle from the rising portion 51a toward the sensor holder 28 and protrudes. The angle of the rising portion 51a with respect to the base portion 48a is not limited to the right angle, and may be an angle (e.g., 85° to 95°) close to the right angle. Similarly, the angle of the fold-back portion 51b with respect to the rising portion 51a is not limited to the right angle, and may be an angle (e.g., 85° to 95°) close to the right angle. In a case of the hook 51 having the above shape, when the one end portion of the band portion 30 is hooked on the hook 51, and then the other end portion of the band portion 30 is hooked on the hook 50 on the opposite side, the one end portion of the band portion 30 is hardly detached from the hook 51.

Next, when the other end portion of the band portion 30 is coupled to the sensor holder 28 (the other hook 50 is engaged with the other engagement hole 52), the sensor fixture 10A is loosely disposed along the outer circumferential surface 15 of the cylinder tube 14. In this state, the fastening screw 58 of the fastening mechanism 32 is fastened. Then, as a protrusion length of the distal end 67 of the fastening screw 58 from the nut 56 becomes longer, a distance between a portion (flat plate portion 62) of the band portion 30 in which the fastening screw 58 is inserted, and the outer circumferential surface 15 of the cylinder tube 14 becomes greater.

As a result, a tension is applied to the band portion 30, i.e., the band portion 30 is tightened. Therefore, the sensor holder 28 is strongly pulled against the outer circumferential surface 15 of the cylinder tube 14. Thus, the position sensor 16 is attached to the outer circumferential surface 15 of the cylinder tube 14. In this case, the sensor holder 28 and the fastening mechanism 32 are arranged at positions different from each other in the circumferential direction. Therefore, the cylinder tube 14 only has a small protrusion from the outer circumferential surface 15.

When a position of the position sensor 16 with respect to the cylinder tube 14 is adjusted, the locking screw 46 is loosened, and then the position sensor 16 is slid in the longitudinal direction of the sensor holder 28 (the axial direction of the fluid pressure cylinder 12) and is moved to a desired position. Then, the locking screw 46 is fastened to fix the position sensor 16.

After the sensor fixture 10A in a state where the position sensor 16 is not fixed to the sensor holder 28 is loosely disposed along the outer circumferential surface 15 of the cylinder tube 14 or after the sensor fixture 10A in a state where the position sensor 16 is not fixed to the sensor holder 28 is disposed on the outer circumferential surface 15 of the cylinder tube 14, and the fastening screw 58 is fastened, the position sensor 16 may be fixed to the sensor holder 28.

As described above, in the sensor fixture 10A, the sensor holder 28 is formed in the rail shape, and the fastening mechanism 32 is arranged at a position shifted from the sensor holder 28 in the circumferential direction, so that it is possible to easily adjust an attachment position of the position sensor 16 with respect to the cylinder tube 14 and achieve a compact structure.

In a case of the present embodiment, the fastening mechanism 32 includes the female screw portion 54 that is provided on the band portion 30, the fastening screw 58 that is screwed into the female screw portion 54, and the abutment plate 60 that is arranged inside the band portion 30 at the position corresponding to the female screw portion 54. The abutment plate 60 is in abutment with the outer circumferential surface 15 of the cylinder tube 14 and is pressed by the fastening screw 58. With this configuration, it is possible to easily tighten the band portion 30 by fastening the fastening screw 58. The abutment plate 60 is interposed between the outer circumferential surface 15 of the cylinder tube 14 and the fastening screw 58, and the fastening screw 58 does not directly contact the outer circumferential surface 15 of the cylinder tube 14. Consequently, it is possible to effectively prevent deformation of the outer circumferential surface 15 of the cylinder tube 14 during fastening of the fastening screw 58.

In the case of the present embodiment, the nut 56 in which the female screw portion 54 is formed is fixated to the band portion 30. Consequently, it is possible to easily arrange the female screw portion 54 into which the fastening screw 58 is appropriately screwed. That is, while it is difficult to directly form the screw hole in the band portion 30 of the thin plate, it is easy to fixate the nut 56 to the band portion 30.

In the case of the present embodiment, the sensor holder 28 includes a holder main body 29, and the coupling arm portions 48 that protrude from the both sides of the holder main body 29 and are bent. Consequently, it is possible to easily couple the sensor holder 28 and the band portion 30. The engagement holes 52 are formed at the both end portions of the band portion 30 and can engage with the coupling arm portions 48. The fastening mechanism 32 is provided at a substantially center position in the extension direction of the band portion 30. Therefore, the fastening mechanism 32 is located at a portion distant from the engagement portion of the sensor holder 28 and the band portion 30. Consequently, by preventing the hooks 50 of the coupling arm portions 48 from slipping from the engagement holes 52 during fastening of the fastening screw 58, it is possible to reliably attach the position sensor 16 to the outer circumferential surface 15 of the cylinder tube 14.

[Second Embodiment]

Figure 6:
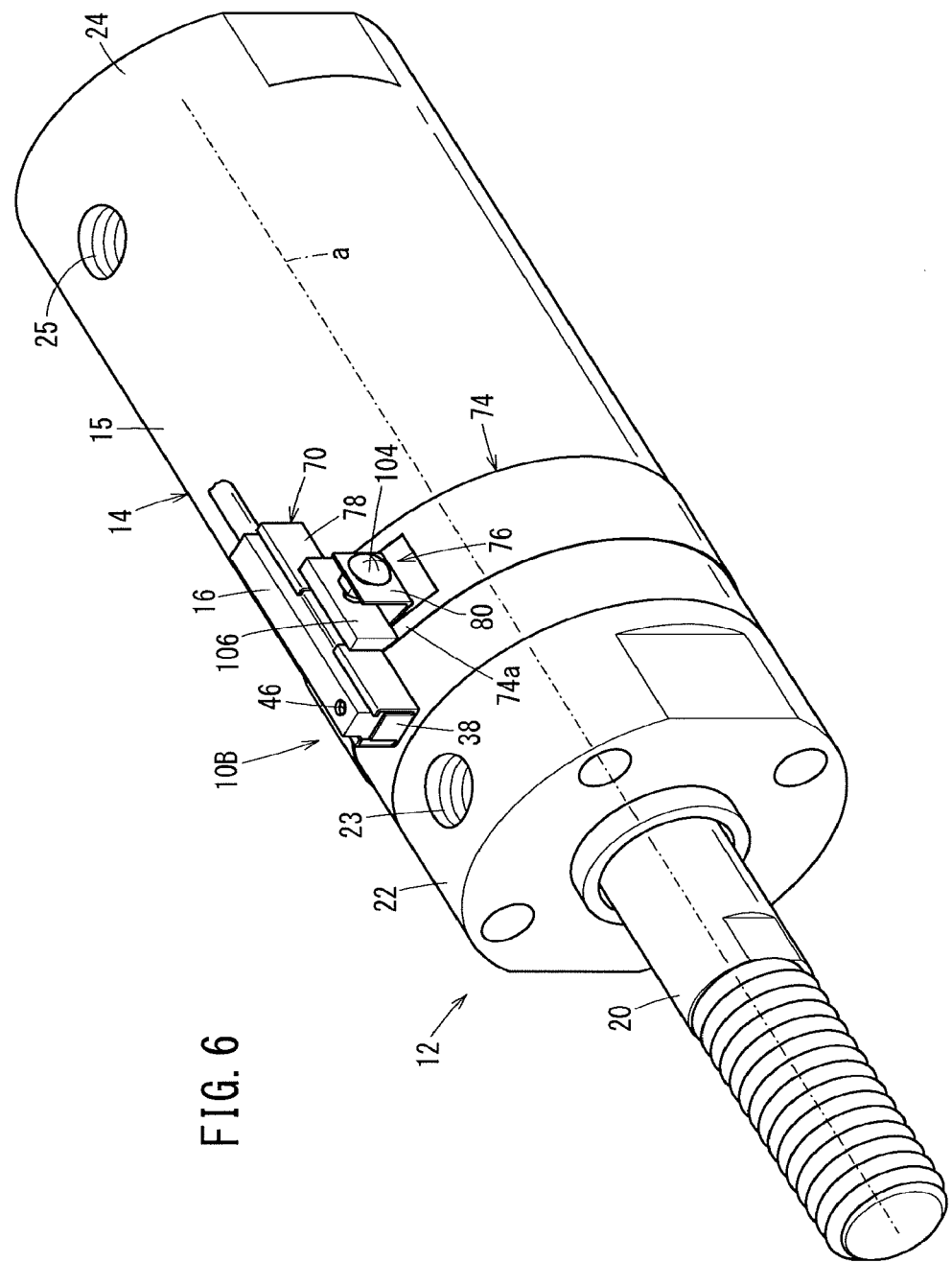
FIG. 6 is a perspective view of a fluid pressure cylinder to which a sensor fixture according to a second embodiment of the present invention is attached.

As shown in FIG. 6, a sensor fixture 10B according to the second embodiment of the present invention is attached to the outer circumferential surface 15 of the cylinder tube 14 of the fluid pressure cylinder 12 (e.g., air cylinder), and is used to attach the position sensor 16 to the outer circumferential surface 15.

The sensor fixture 10B includes a rail-shaped sensor holder 70 that holds the position sensor 16, a band portion 74 that is coupled to the sensor holder 70 via a first end portion 74a and a second end portion 74b and is wound around the outer circumferential surface 15 of the cylinder tube 14, and a fastening mechanism 76 that fastens the band portion 74.

Figure 7:
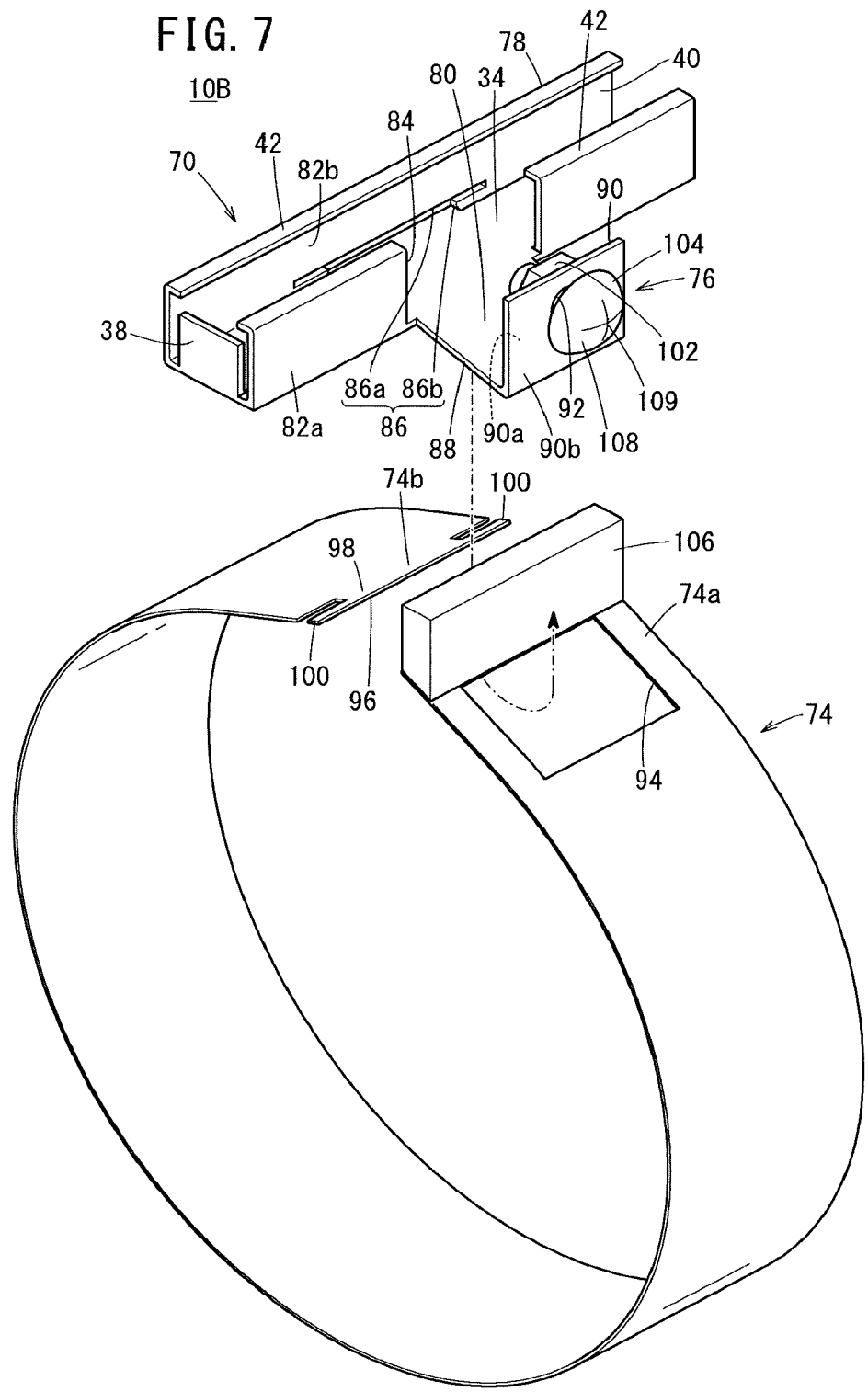
FIG. 7 is an exploded perspective view of the sensor fixture shown in FIG. 6.
Figure 8:
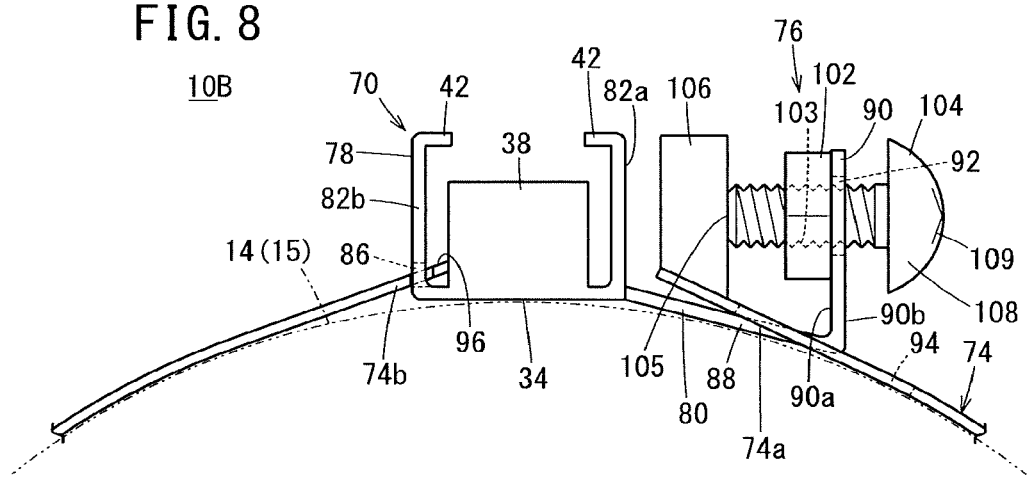
FIG. 8 is an enlarged view of main parts of the sensor fixture shown in FIG. 6.

As shown in FIGS. 7 and 8, the sensor holder 70 includes a holder main body 78, and an arm portion 80 that protrudes sideward from the holder main body 78 and is bent. The holder main body 78 includes a bottom wall 34 having the rectangular shape, a first sidewall 82a and a second sidewall 82b that are vertically arranged from long sides on both sides of the bottom wall 34 and face toward each other, and an end wall 38 that is vertically arranged from a short side on one end side of the bottom wall 34. The bottom wall 34, the first sidewall 82a and the second sidewall 82b form a sensor insertion groove 40 that houses and holds the position sensor 16 so as to enable position adjustment of the position sensor 16. Overhang portions 42 are formed at edges of the first sidewall 82a and the second sidewall 82b remote from the bottom wall 34, and protrude toward the inside of the sensor holder 70.

A cutout portion 84 is formed at a portion of the first sidewall 82a corresponding to the arm portion 80. The second sidewall 82b has, at a root portion thereof, a coupling hole 86 as a coupling portion with the second end portion 74b of the band portion 74, and the coupling hole 86 penetrates through the second sidewall 82b in a thickness direction thereof. The coupling hole 86 includes an insertion hole 86a that thinly extends in the longitudinal direction of the holder main body 78, and an engagement hole 86b that is formed closer to the bottom wall 34 than the insertion hole 86a and is narrower than the insertion hole 86a.

The arm portion 80 includes a protrusion portion 88 that protrudes sideward from the bottom wall 34 of the holder main body 78 while slightly inclining downward, and a rising piece 90 that is bent upward from an end portion of the protrusion portion 88 in a protrusion direction thereof. The rising piece 90 has an insertion hole 92 that penetrates therethrough in the thickness direction.

This sensor holder 70 is made of, for example, metal such as stainless steel, and can be formed by performing press working and folding on a metal plate. A method for fixing the position sensor 16 to the sensor holder 70 is the same as the first embodiment.

The band portion 74 includes a first end portion 74a and a second end portion 74b. The band portion 74 can be coupled to the sensor holder 70 via the first end portion 74a and the second end portion 74b, and is configured to be attached onto the outer circumferential surface 15 of the cylinder tube 14 along the circumferential direction. In a case of the present embodiment, the first end portion 74a of the band portion 74 is couplable to the sensor holder 70 via the fastening mechanism 76. The band portion 74 can be formed by curving and deforming, for example, a belt-shaped thin sheet metal in a circular arc shape.

An opening portion 94 is formed at the first end portion 74a of the band portion 74 and penetrates through the band portion 74 in the thickness direction. The above arm portion 80 is inserted from an inside of the band portion 74 into the opening portion 94, and the rising piece 90 faces toward a stopper 106 of the fastening mechanism 76 described later on an outside of the band portion 74.

As shown in FIG. 7, an engagement portion 96 having a T shape is provided at the second end portion 74b of the band portion 74, and is couplable to the coupling hole 86 of the sensor holder 70. More specifically, the engagement portion 96 includes a base portion 98, and engagement projections 100 that protrude from the base portion 98 toward both sides in a width direction of the band portion 74. When the engagement portion 96 is inserted from an outside of the sensor holder 70 into the insertion hole 86a of the coupling hole 86, and the base portion 98 is moved in the engagement hole 86b, the engagement projections 100 engage with an inner surface of the second sidewall 82b, and the second end portion 74b of the band portion 74 is coupled to the sensor holder 70.

As shown in FIGS. 7 and 8, the fastening mechanism 76 includes a nut 102 that is fixated to the arm portion 80 and in which a female screw portion 103 is formed, a fastening screw 104 that is screwed into the nut 102, and the stopper 106 that is provided at the first end portion 74a of the band portion 74 and is pressed by the fastening screw 104. In the present embodiment, the nut 102 is fixated by welding to a surface 90a of the rising piece 90 on a side closer to the holder main body 78. Alternatively the nut 102 may be fixated to a surface 90b of the rising piece 90 on a side remote from the holder main body 78.

The fastening screw 104 is inserted in the insertion hole 92 formed in the rising piece 90 without being screw-engaged therein. For the purpose of turning the fastening screw 104 by a tool such as a screwdriver or a hexagonal wrench, a non-circular (cross-shaped, hexagonal, etc.) tool insertion groove 109 is formed at a head portion 108 of the fastening screw 104. A distal end 105 of the fastening screw 104 can protrude from the nut 102 toward the stopper 106.

The stopper 106 provided at the first end portion 74a of the band portion 74 is made of, for example, metal, and is fixated to the first end portion 74a by welding. The stopper 106 is disposed between the holder main body 78 of the sensor holder 70 and the rising piece 90, and is pressed toward the holder main body 78 by the fastening screw 104.

Next, operation and effects of the sensor fixture 10B constructed as described above will be described.

To attach the position sensor 16 to the outer circumferential surface 15 of the cylinder tube 14 by using the sensor fixture 10B, the position sensor 16 is first inserted and fixed in the sensor holder 70, and the sensor fixture 10B in this state is loosely disposed along the outer circumferential surface 15 of the cylinder tube 14. More specifically, the arm portion 80 of the sensor holder 70 is inserted in the opening portion 94 of the band portion 74 so as to dispose the stopper 106 between the holder main body 78 and the loosened fastening screw 104. Further, the second end portion 74b (engagement portion 96) of the band portion 74 is coupled to the second sidewall 82b (coupling hole 86) of the sensor holder 70. Then, the band portion 74 is wound around the cylinder tube 14 along the outer circumferential surface 15.

Next, the fastening screw 104 of the fastening mechanism 76 is fastened. Then, as a protrusion length of the distal end 105 of the fastening screw 104 from the nut 102 becomes longer, a distance between the rising piece 90 and the stopper 106 becomes greater. As a result, a tension is applied to the band portion 74, i.e., the band portion 74 is tightened. Therefore, the sensor holder 70 is strongly pulled against the outer circumferential surface 15 of the cylinder tube 14. Consequently, the position sensor 16 is attached to the outer circumferential surface 15 of the cylinder tube 14. In this case, the sensor holder 70 and the fastening mechanism 76 are arranged at positions different from each other in the circumferential direction. Therefore, the cylinder tube 14 only slightly protrudes from the outer circumferential surface 15.

In this regard, after the sensor fixture 10B in a state where the position sensor 16 is not fixed to the sensor holder 70 is loosely disposed along the outer circumferential surface 15 of the cylinder tube 14 or after the sensor fixture 10B in a state where the position sensor 16 is not fixed to the sensor holder 70 is disposed on the outer circumferential surface 15 of the cylinder tube 14, and the fastening screw 104 is fastened, the position sensor 16 may be fixed to the sensor holder 70.

When the position of the position sensor 16 with respect to the cylinder tube 14 is adjusted, the locking screw 46 (see FIG. 3) is loosened, and then the position sensor 16 is slid M the longitudinal direction of the sensor holder 70 (the axial direction of the fluid pressure cylinder 12) and is moved to a desired position. Then, the locking screw 46 is fastened to fix the position sensor 16.

As described above, in the sensor fixture 10B, the sensor holder 70 is formed in the rail shape, and the fastening mechanism 76 is arranged at a position shifted from the sensor holder 70 in the circumferential direction, so that it is possible to easily adjust the attachment position of the position sensor 16 with respect to the cylinder tube 14, and achieve a compact structure.

In the case of the present embodiment, the fastening mechanism 76 includes the female screw portion 103 that is provided on the arm portion 80 of the sensor holder 70, the fastening screw 104 that is screwed into the female screw portion 103, and the stopper 106 that is provided at one end portion of the band portion 74 and is pressed by the fastening screw 104. With this configuration, by fastening the fastening screw 104, it is possible to easily tighten the band portion 74. The fastening screw 104 does not directly contact the outer circumferential surface 15 of the cylinder tube 14. Consequently, it is possible to effectively prevent deformation of the outer circumferential surface 15 of the cylinder tube 14 during fastening of the fastening screw 104.

The arm portion 80 is inserted in the opening portion 94 and faces toward the stopper 106 at an outside of the band portion 74. Consequently, it is possible to suitably apply tension to the band portion 74. Particularly, the nut 102 in which the female screw portion 103 is formed is fixated to the arm portion 80. Consequently, it is possible to easily form the female screw portion 103 into which the fastening screw 104 is appropriately screwed.

Components of the second embodiment common to those in the first embodiment provide the same or similar functions and effects as those in the first embodiment.

[Third Embodiment]

Figure 9:
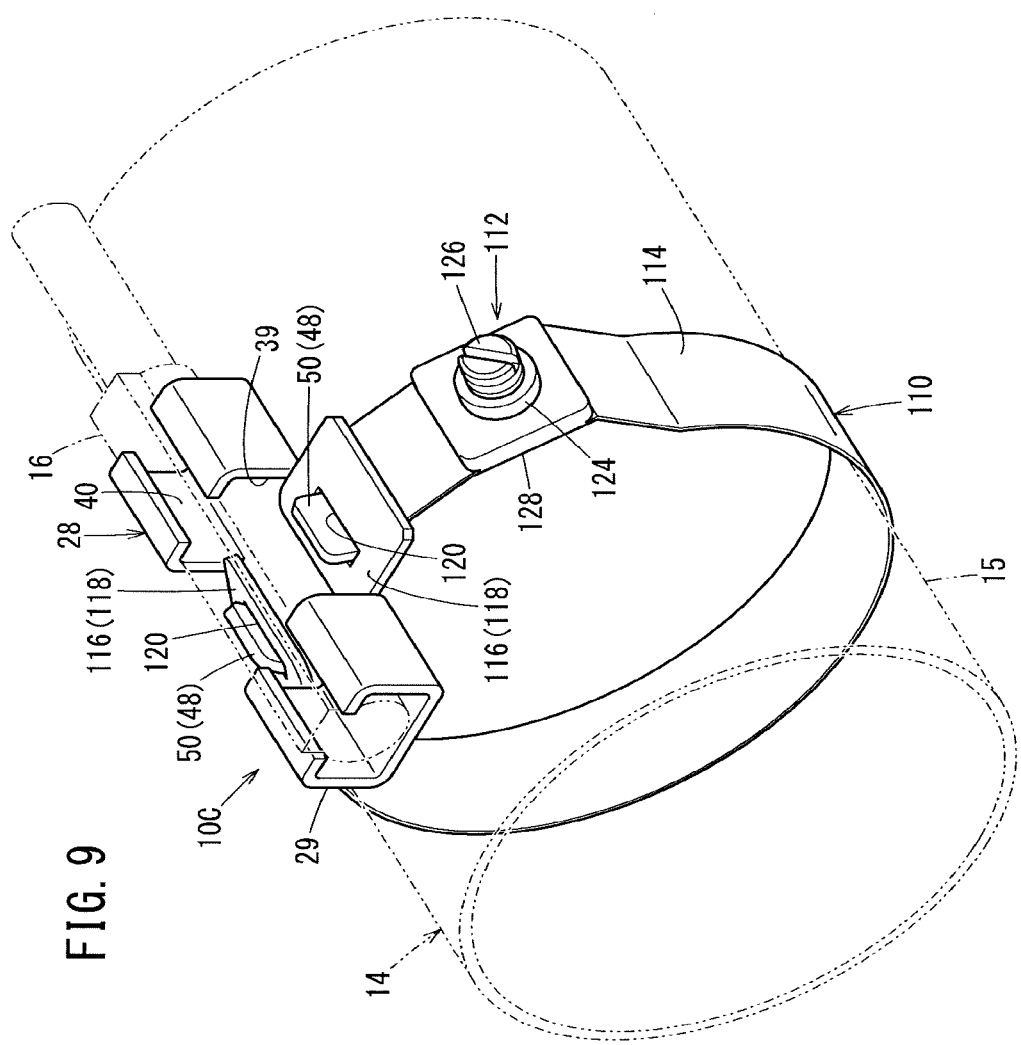
FIG. 9 is a perspective view of a sensor fixture according to a third embodiment of the present invention.

As in the above embodiments, as shown in FIG. 9, a sensor fixture 10C according to the third embodiment of the present invention is attached to the outer circumferential surface 15 of the cylinder tube 14 and is used to attach the position sensor 16 to the outer circumferential surface 15. The sensor fixture 10C is a modification of the sensor fixture 10A according to the first embodiment. Differences of the sensor fixture 10C from the sensor fixture 10A will be mainly described below. In FIG. 9, the cylinder tube 14 is shown by imaginary lines for simplicity. The same applies to FIGS. 11 and 13, too.

In FIG. 9, the sensor fixture 10C includes the rail-shaped sensor holder 28 that holds the position sensor 16, a band portion 110 that is detachably coupled to the sensor holder 28 and is wound around the outer circumferential surface 15 of the cylinder tube 14, and a fastening mechanism 112 that fastens the band portion 110. A configuration of the sensor holder 28 of the sensor fixture 10C is the same as that of the sensor holder 28 of the sensor fixture 10A.

The band portion 110 includes a band main body 114 that extends in a belt shape, and reinforcement plates 116 that are coupled to both end portions of the band main body 114. These reinforcement plates 116 form band end portions 118 that are both end portions of the band portion 110.

Each band end portion 118 has an engagement hole 120 penetrating through the reinforcement plate 116 in the thickness direction and which can engage with the hook 50 of the sensor holder 28. The hooks 50 of the coupling arm portions 48 are inserted in the engagement holes 120, and the hooks 50 are protruded from the engagement holes 120 toward the outer circumference side of the band portion 110. Thus, the coupling arm portions 48 and the end portions of the band portion 110 are coupled.

Figure 10:
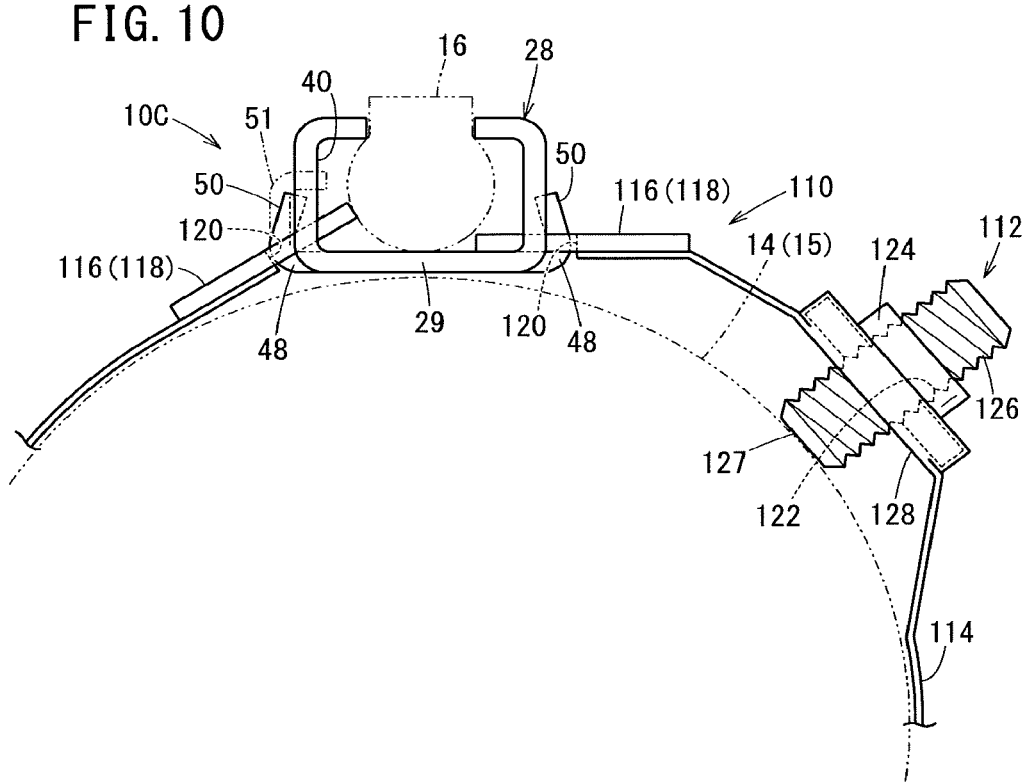
FIG. 10 is a front view of the sensor fixture shown in FIG. 9.

As shown in FIG. 10, in a state where the band end portions 118 engage with the hooks 50, the band end portions 118 protrude into the sensor holder 28 (i.e., sensor insertion groove 40) via the cutout portions 39 of the sensor holder 28. In the state where the position sensor 16 is attached to the sensor holder 28, edges of the band end portions 118 are in abutment against or close contact with the position sensor 16. In a state where the sensor fixture 10C is attached to the outer circumferential surface 15 of the cylinder tube 14, each hook 50 inclines toward the holder main body 29 with respect to a normal line of the outer circumferential surface 15 at a position at which the hook 50 is located. As indicated by the imaginary lines, the sensor fixture 10C may employ the hook 51 shown in FIG. 4 in place of the one hook 50. Sensor fixtures 10D, 10E described below also may employ the hook 51 in place of the one hook 50 similarly (see FIGS. 12 and 14).

The fastening mechanism 112 is provided on the band main body 114. The fastening mechanism 112 is provided at a position relatively close to the band end portion 118. In this case, an angle around a center of the cylinder tube 14 between the center of the engagement hole 120 and the center of the fastening mechanism 112 is, for example, 90° or less and is preferably 45° or less. With this configuration, in a state where the sensor fixture 10C is attached to the cylinder tube 14, the fastening mechanism 112 is disposed at a position close to the sensor holder 28. Consequently, it is easy to operate the fastening mechanism 112.

The fastening mechanism 112 includes a nut 124 that is fixated to the band main body 114 and in which a female screw portion 122 is formed, and a fastening screw 126 that is screwed into the female screw portion 122. The band main body 114 includes a flat plate portion 128 at a portion to which the nut 124 is fixated. The nut 124 is jointed and fixed to the outer surface of the flat plate portion 128.

A through-hole (not shown) is formed in the flat plate portion 128, and the fastening screw 126 is inserted in the through-hole without being screw-engaged therewith. A distal end 127 of the fastening screw 126 can protrude from the flat plate portion 128 toward an inside of the band portion 110 (toward the cylinder tube 14). In the state where the sensor fixture 10C is attached to the cylinder tube 14, the distal end 127 of the fastening screw 126 is in abutment with the outer circumferential surface 15 of the cylinder tube 14. When the fastening screw 126 is fastened, the band portion 110 is tightened to thereby strongly fix the sensor holder 28 to the cylinder tube 14.

The sensor fixture 10C according to the present embodiment provides the following operation and effects.

To detach the band end portions 118 from the hooks 50 in a state where the band end portions 118 engage with the hooks 50, it is necessary to push and move the band end portions 118 toward the inside of the sensor holder 28. However, even when the band end portions 118 are pushed in the state where the position sensor 16 is attached to the sensor holder 28, the band end portions 118 interfere with the position sensor 16. Therefore, it is not possible to move the band end portions 118 toward the inside of the sensor holder 28 (toward the position sensor 16).

That is, even when the band end portions 118 are pushed in the state where the position sensor 16 is attached to the sensor holder 28, the edges of the band end portions 118 abut on the position sensor 16. Therefore, the band end portions 118 cannot move to positions at which the band end portions 118 are disengaged from the hooks 50. Hence, in the state where the position sensor 16 is attached to the sensor holder 28, the band end portions 118 are prevented from being detached from the hooks 50 due to interference with the position sensor 16. That is, as long as the position sensor 16 is not detached from the sensor holder 28, the band end portions 118 cannot be detached from the hooks 50 of the sensor holder 28. Consequently, even when the fastening screw 126 of the fastening mechanism 112 loosens or the fastening screw 126 falls off, it is possible to avoid a situation where the band portions 110 is detached and then the position sensor 16 falls off the cylinder tube 14.

[Fourth Embodiment]

Figure 11:
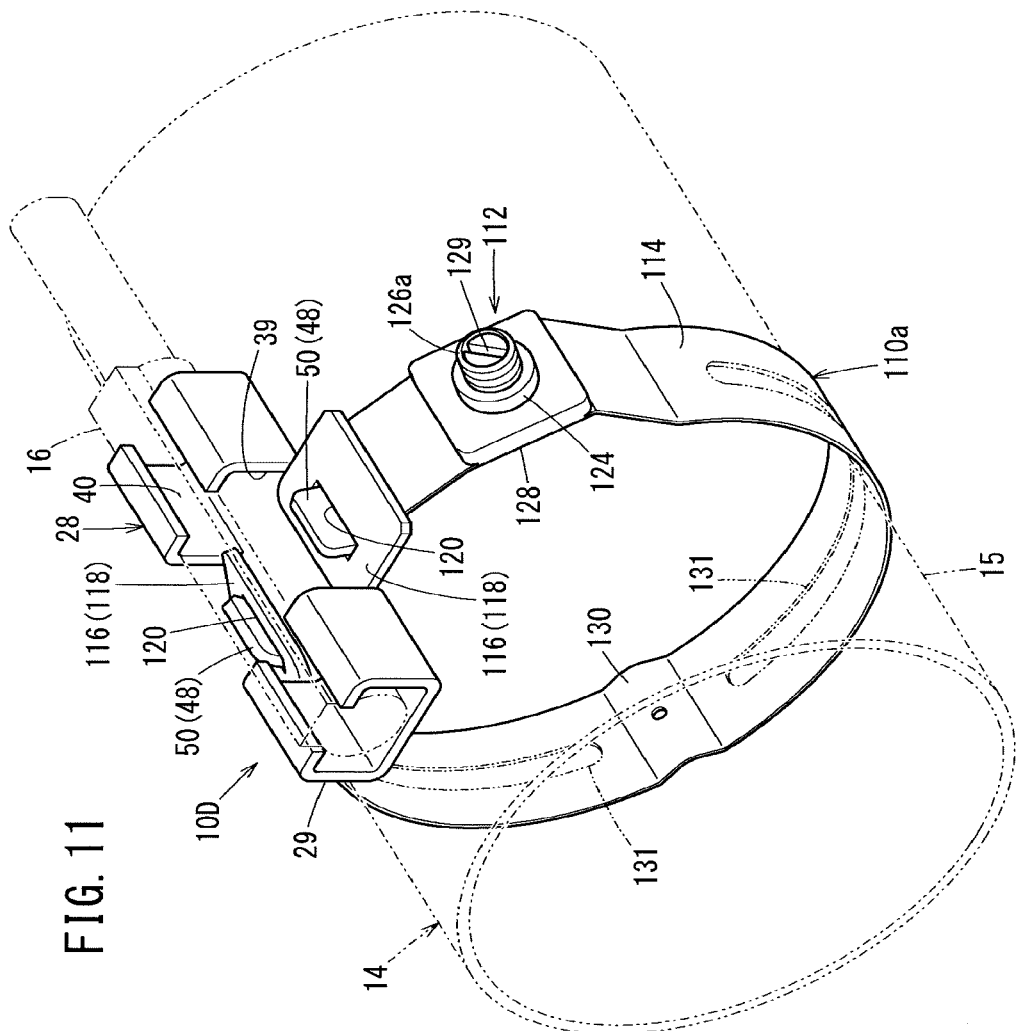
FIG. 11 is a perspective view of a sensor fixture according to a fourth embodiment of the present invention.
Figure 12:
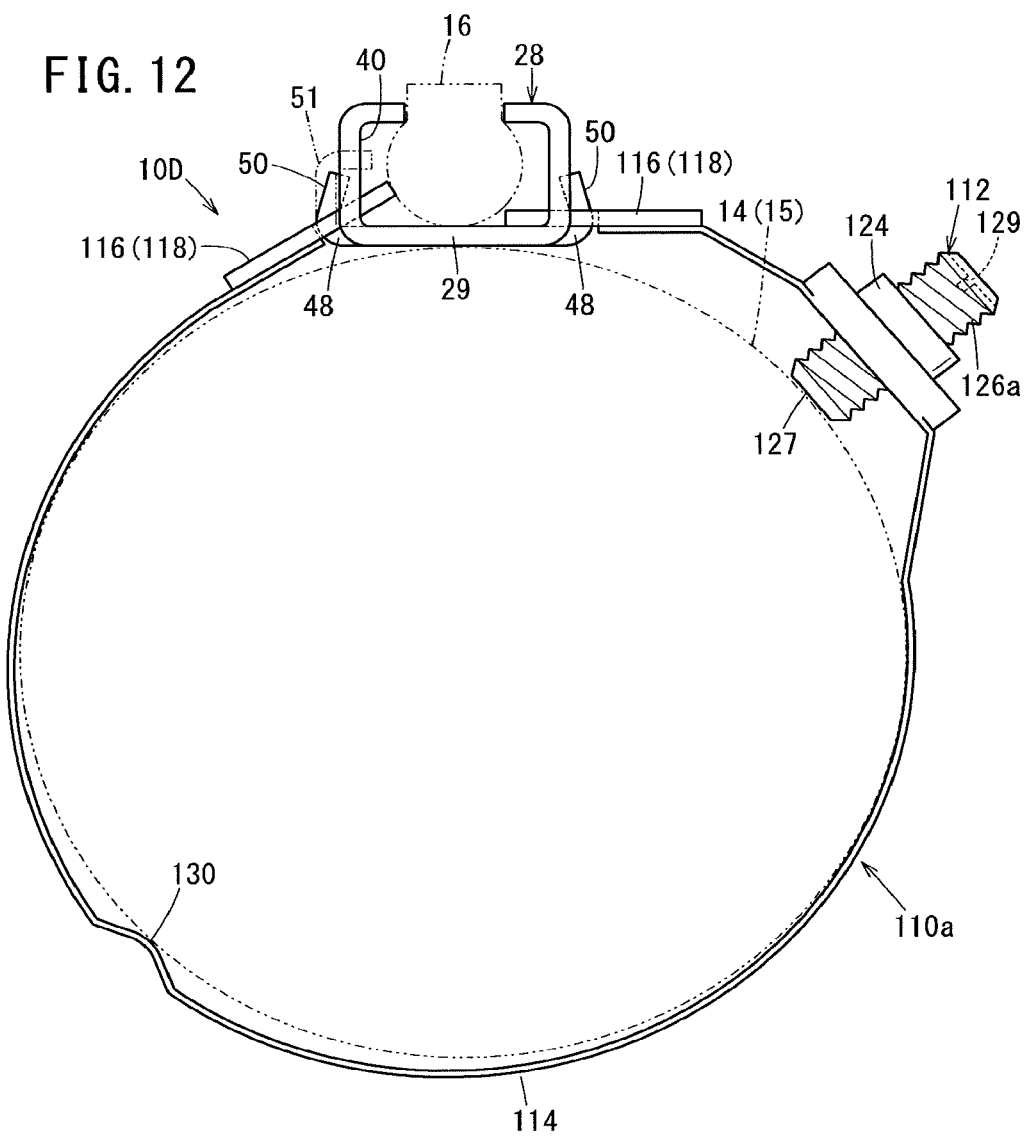
FIG. 12 is a front view of the sensor fixture shown in FIG. 11.

The sensor fixture 10D according to the fourth embodiment of the present invention shown in FIGS. 11 and 12 is a modification of the above sensor fixture 10C. More specifically, a band portion 110a of this sensor fixture 10D includes a projection portion 130 that protrudes inward at a position that is on the opposite side of the cylinder tube 14 from the fastening mechanism 112 (a position shifted approximately 180° or 175° to 185° around the center of the cylinder tube 14) in a state where the sensor fixture 10D is attached to the outer circumferential surface 15 of the cylinder tube 14. In this case, a center of a fastening screw 126a is regarded as a position of the fastening mechanism 112, and a top portion of the projection portion 130 is regarded as a position of the projection portion 130.

The projection portion 130 shown herein is formed by deforming a part of the band main body 114 in the circumferential direction inward, and is curved in an arc shape. In place of the configuration shown herein, the projection portion 130 may be a member that is fixed to an inner circumferential surface of the band main body 114 by an appropriate fixing unit (welding, etc.). In FIG. 11, both ends of a linear groove portion 129 for tool insertion provided at a head portion of the fastening screw 126a are blocked by a surrounding wall of the fastening screw 126a. Consequently, when a distal end portion of a fastening tool (flathead screwdriver, etc.) is inserted in the groove portion 129 to turn the fastening screw 126a, the distal end portion of the tool is hardly detached from the groove portion 129. The above sensor fixture 10C and the sensor fixture 10E described below may employ the above fastening screw 126a instead of the fastening screw 126.

When the sensor fixture 10D configured as described above is disposed on the outer circumferential surface 15 of the cylinder tube 14 (wound along the outer circumferential surface 15) and the fastening screw 126a is fastened, the distal end 127 of the fastening screw 126a abuts on the outer circumferential surface 15 of the cylinder tube 14. When the fastening screw 126a is further fastened, the band portion 110a is accordingly tightened, and the sensor holder 28 is strongly pulled against the outer circumferential surface 15 of the cylinder tube 14. Thus, the position sensor 16 is attached to the outer circumferential surface 15 of the cylinder tube 14. In this case, the distal end 127 of the fastening screw 126a directly abuts on the outer circumferential surface 15 of the cylinder tube 14. Therefore, a significant load acts on a portion abutted by the distal end 127.

By the way, according to the sensor fixture 10C according to the third embodiment, the band portion 110 is not provided with the projection portion 130. Therefore, at the time of tightening of the band portion 110, it is only the fastening screw 126 that protrudes toward the inside of the band portion and strongly abuts on the outer circumferential surface 15. Hence, the load concentrates on the portion abutted by the fastening screw 126 on the outer circumferential surface 15 of the cylinder tube 14, and readily deforms this portion into a recessed shape. There is a risk that, when the portion is deformed into a recessed shape to a certain degree or more, the deformed portion may interfere with the piston disposed in the cylinder tube 14 and the stick-slip phenomenon (knocking) may occur during a piston operation.

By contrast with this, according to the sensor fixture 10D according to the present embodiment, the band portion 110a is provided with the projection portion 130 on an opposite side of the cylinder tube from the fastening mechanism 112 (fastening screw 126a). Hence, during fastening of the fastening mechanism 112, not only the fastening screw 126a but also the projection portion 130 abut on the outer circumferential surface 15 of the cylinder tube 14. Consequently, force that presses the outer circumferential surface 15 of the cylinder tube 14 during fastening of the fastening mechanism 112 is moderately dispersed in the circumferential direction. Consequently, in comparison with a case where the projection portion 130 is not provided, it is possible to suppress deformation of the outer circumferential surface 15 in the recessed shape, and correct the shape (roundness) of the cylinder tube 14. Consequently, it is possible to suppress the stick-slip phenomenon during the piston operation.

As indicated by the imaginary lines in FIG. 11, the band portion 110a may have slits 131 that penetrate through the band main body 114 in the thickness direction and extend in the extension direction of the band main body 114. In this case, the slits 131 may be formed respectively at a portion of the band main body 114 between the fastening mechanism 112 and the projection portion 130, and at a portion thereof between the projection portion 130 and the band end portion 118. By providing the slits 131, it is possible to improve the degree of close contact between the outer circumferential surface 15 of the cylinder tube 14 and the band main body 114. Thus, it is possible to suppress positional displacement of the sensor fixture 10D with respect to the cylinder tube 14 and also suppress rattling caused by vibrations of the band portion 110a.

[Fifth Embodiment]

Figure 13:
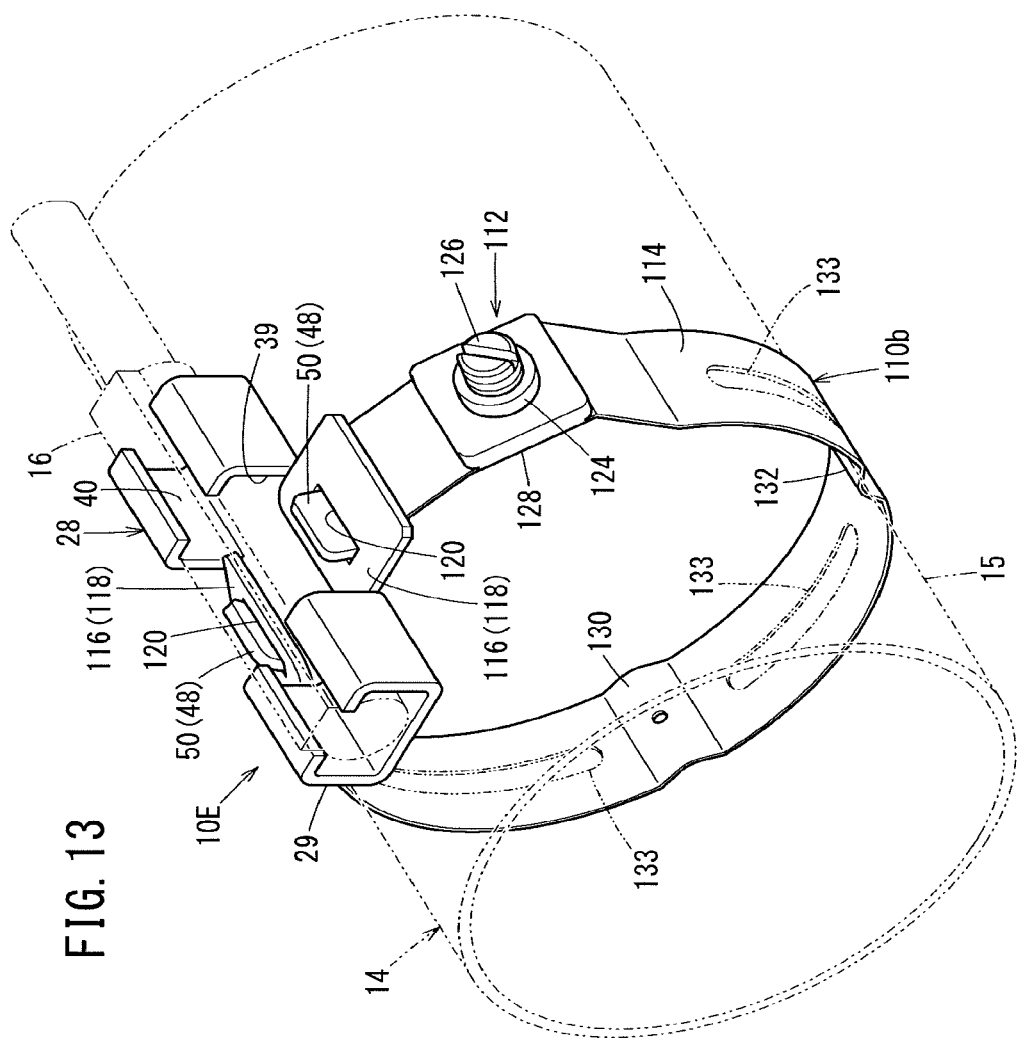
FIG. 13 is a perspective view of a sensor fixture according to a fifth embodiment of the present invention.

The sensor fixture 10E according to the fifth embodiment of the present invention shown in FIGS. 13 and 14 is a modification of the above sensor fixture 10D, and is an embodiment where another projection portion 132 is added. More specifically, a band portion 110b of the sensor fixture 10E includes the other projection portion 132 that protrudes inward at a substantially center position between the fastening mechanism 112 and the projection portion 130 (a position shifted approximately 90° from the fastening screw 126 in the circumferential direction around the cylinder tube 14 disposed inside). In this case, a center of the fastening screw 126 is regarded as a position of the fastening mechanism 112, and a top portion of the projection portion 132 is regarded as a position of the projection portion 132.

The projection portion 132 shown herein is formed by deforming a part of the band main body 114 in the circumferential direction inward, and is curved in an arc shape. The projection portion 132 may be a member that is fixed by an appropriate fixing means (welding, etc.) to an inner circumferential surface of the band main body 114.

According to the sensor fixture 10E constructed as described above, during fastening of the fastening mechanism 112, not only the fastening screw 126 but also the two projection portions 130, 132 abut on the outer circumferential surface 15 of the cylinder tube 14. Thus, force that presses the outer circumferential surface 15 of the cylinder tube 14 during fastening of the fastening mechanism 112 is further dispersed in the circumferential direction. Consequently, it is possible to more effectively suppress the stick-slip phenomenon during the piston operation.

As indicated by the imaginary lines in FIG. 13, the band portion 110b may have slits 133 that penetrate through the band main body 114 in the thickness direction and extend in the extension direction of the band main body 114. In this case, the slits 133 may be formed respectively at a portion of the band main body 114 between the fastening mechanism 112 and the projection portion 132, a portion thereof between the projection portion 130 and the projection portion 132, and a portion thereof between the projection portion 130 and the band end portion 118. By providing the slits 133, it is possible to improve the degree of close contact between the outer circumferential surface 15 of the cylinder tube 14 and the band main body 114. Thus, it is possible to suppress positional displacement of the sensor fixture 10E with respect to the cylinder tube 14 and also suppress rattling caused by vibrations of the band portion 110b.

The present invention is not limited to the above embodiments, and can be variously modified without departing from the scope of the present invention.

The invention claimed is:

1. A sensor fixture configured to attach a sensor to an outer circumferential surface of a cylinder tube, the sensor fixture comprising:
   a rail-shaped sensor holder including a sensor insertion groove configured to house and hold the sensor so as to enable position adjustment of the sensor;
   a band portion including end portions couplable to the sensor holder, the band portion being configured to be attached to the outer circumferential surface of the cylinder tube along a circumferential direction thereof; and
   a fastening mechanism disposed at a circumferential position different from the sensor holder on the outer circumferential surface of the cylinder tube, the fastening mechanism being configured to fasten the band portion,
   wherein the fastening mechanism includes:
   a female screw portion provided on the band portion;

a fastening screw configured to be screwed into the female screw portion; and
an abutment plate provided inside the band portion at a position corresponding to the female screw portion and configured to be placed in abutment with the outer circumferential surface of the cylinder tube and pressed by the fastening screw.

2. The sensor fixture according to claim 1, wherein a nut in which the female screw portion is formed is fixated to the band portion.

3. The sensor fixture according to claim 1, wherein:
the sensor holder includes:
a holder main body; and
coupling arm portions protruding from both sides of the holder main body and provided with hooks;
the band portion includes, at the end portions, engagement holes with which the hooks can engage; and
the fastening mechanism is provided at a substantially center position of the band portion in an extension direction thereof.

4. A sensor fixture configured to attach a sensor to an outer circumferential surface of a cylinder tube, the sensor fixture comprising:
a rail-shaped sensor holder including a sensor insertion groove configured to house and hold the sensor so as to enable position adjustment of the sensor;
a band portion including end portions couplable to the sensor holder, the band portion being configured to be attached to the outer circumferential surface of the cylinder tube along a circumferential direction thereof; and
a fastening mechanism disposed at a circumferential position different from the sensor holder on the outer circumferential surface of the cylinder tube, the fastening mechanism being configured to fasten the band portion, wherein
the sensor holder includes:
a holder main body; and
an arm portion protruding sideward from the holder main body and bent; and the fastening mechanism includes:
a female screw portion provided on the arm portion;
a fastening screw configured to be screwed into the female screw portion; and
a stopper provided at one of the end portions of the band portion and pressed by the fastening screw.

5. The sensor fixture according to claim 4, wherein:
an opening portion is formed at the one of the end portions of the band portion and penetrates through the band portion in a thickness direction thereof; and
the arm portion is inserted in the opening portion, and faces toward the stopper at an outside of the band portion.

6. The sensor fixture according to claim 4, wherein a nut in which the female screw portion is formed is fixated to the arm portion.

7. A sensor fixture configured to attach a sensor to an outer circumferential surface of a cylinder tube, the sensor fixture comprising:
a rail-shaped sensor holder including a sensor insertion groove configured to house and hold the sensor so as to enable position adjustment of the sensor;
a band portion including end portions couplable to the sensor holder, the band portion being configured to be attached to the outer circumferential surface of the cylinder tube along a circumferential direction thereof; and
a fastening mechanism disposed at a circumferential position different from the sensor holder on the outer circumferential surface of the cylinder tube, the fastening mechanism being configured to fasten the band portion, wherein
the sensor holder includes:
a holder main body; and
coupling arm portions protruding from both sides of the holder main body, and provided with hooks;
band end portions are provided at the end portions of the band portion, and include engagement holes with which the hooks can engage; and
in a state where the sensor is attached to the holder main body, the band end portions are prevented from being disengaged from the hooks due to interference with the sensor.

8. A sensor fixture configured to attach a sensor to an outer circumferential surface of a cylinder tube, the sensor fixture comprising:
a rail-shaped sensor holder including a sensor insertion groove configured to house and hold the sensor so as to enable position adjustment of the sensor;
a band portion including end portions couplable to the sensor holder, the band portion being configured to be attached to the outer circumferential surface of the cylinder tube along a circumferential direction thereof; and
a fastening mechanism disposed at a circumferential position different from the sensor holder on the outer circumferential surface of the cylinder tube, the fastening mechanism being configured to fasten the band portion, wherein
the fastening mechanism includes:
a female screw portion provided on the band portion; and
a fastening screw configured to be screwed into the female screw portion, and placed in abutment with the outer circumferential surface of the cylinder tube in a state where the sensor fixture is attached to the cylinder tube; and
the band portion includes a projection portion protruding inward at a position on an opposite side of the cylinder tube from the fastening mechanism in the state where the sensor fixture is attached to the cylinder tube.

9. The sensor fixture according to claim 8, wherein the band portion includes another projection portion protruding inward at a substantially center position between the fastening mechanism and the projection portion.

* * * * *